Oct. 12, 1948.    W. J. HUGHES    2,451,029
FLOW CONTROLLER RESET
Filed Feb. 4, 1944    2 Sheets-Sheet 1

INVENTOR.
Walter J. Hughes,
BY
*Robyn Hilcox*
ATTY.

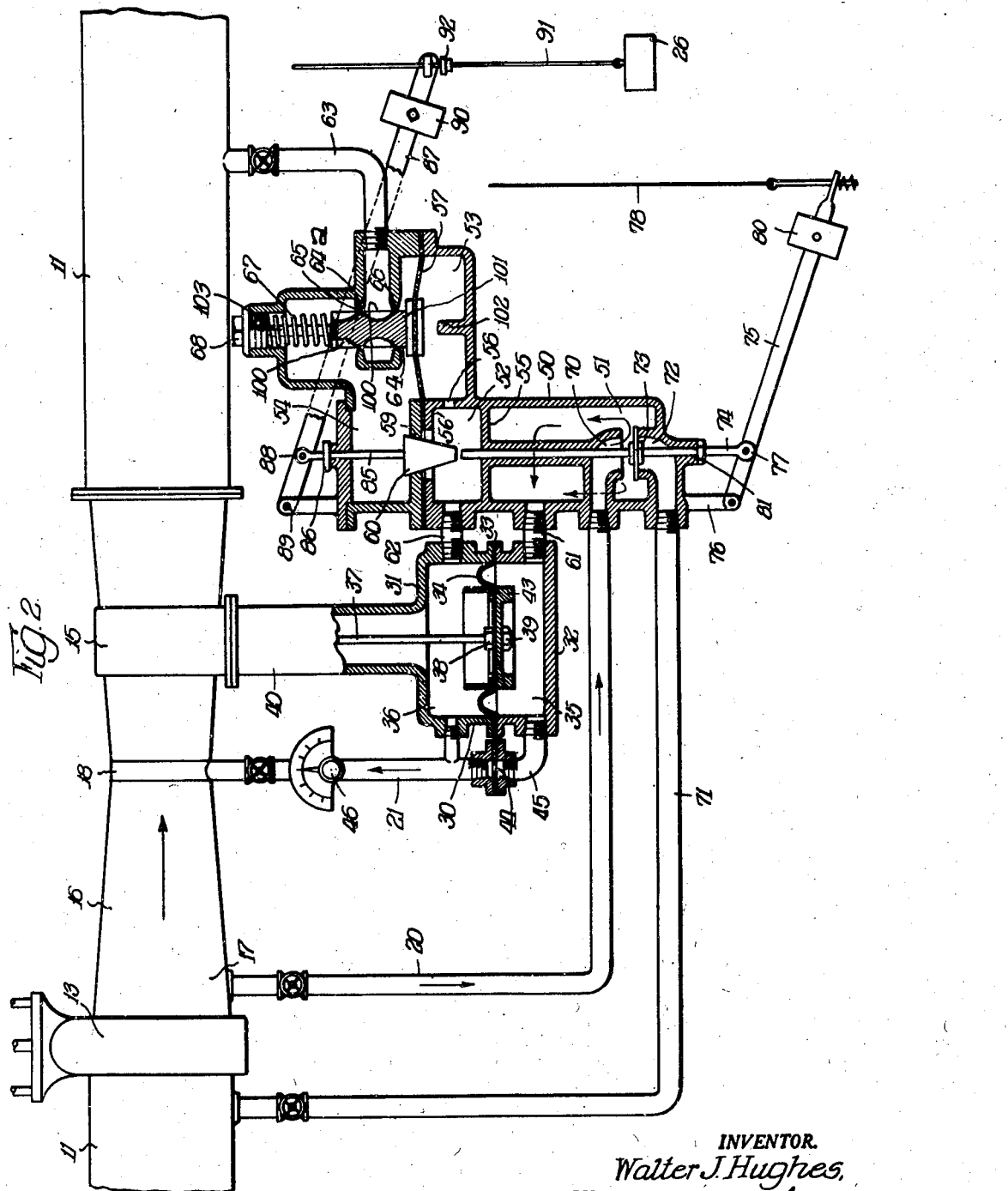

Patented Oct. 12, 1948

2,451,029

UNITED STATES PATENT OFFICE 2,451,029

FLOW CONTROLLER RESET

Walter J. Hughes, Chicago, Ill., assignor to Infilco Incorporated, Chicago, Ill., a corporation of Delaware Application February 4, 1944, Serial No. 521,096

11 Claims. (Cl. 210—122.1)

My invention relates generally to fluid flow controllers, and particularly to a device for use with such fluid flow controllers for terminating or modifying rate of flow, as fixed by such controllers, in accordance with some independent function such as termination of flow through such controller, the filling of a clearwell, and the like.

More particularly the invention relates to a device for modifying or resetting a controller of the type adapted to regulate a flow of fluid through a conduit for the purpose of maintaining a uniform flow therethrough in spite of variations in pressure resistance in the system, as, for example, a flow controller to maintain the flow of water through a gravity filter bed at a uniform rate. The invention has particular utility in resetting such a control device to gradually close the control valve after another valve in the line has been used to shut off the flow therethrough, or when some outside condition arises, such as the filling of a filtered liquid basin to a predetermined level, or both, and to gradually reopen the control valve, starting from a closed position, when the flow is again permitted.

A principal object of my invention is to provide hydraulic means for resetting the controlling element of such controllers when the flow therethrough is cut off by closing a valve in the line regulated by the controller. Ordinarily, a direct acting controller opens its valve or controlling element to wide open position when flow is restricted or cut off by any means external to the controller. Therefore when flow is again established, the controller must necessarily start action with its controlling valve or element in wide open position. Objection to starting the controlling action from a wide open rather than a throttling position has arisen from the fact that there may be a "surge," or high rate of flow, at the start or until the controlling element can be moved to an effective position. It is, therefore, desirable that the controlling element be in a throttling position at the resumption of flow, so that the flow will be controlled up to the desired rate instead of down from a momentary higher rate than desired. Avoiding such initial surges, for instance in starting large filter bed units after they have been shut down for backwashing or reconditioning, avoids disturbance of a freshly reconditioned and loosened filter bed and enables the operator to place it in efficient operation more quickly and with less chance of channeling or upsetting, which may require stopping and repeating the reconditioning process before service can be restored.

Another principal object is to provide an apparatus and process for modifying the set rate of flow of the controller by gradual reduction and gradual restoration of the set rate with the rise and fall respectively of the level of liquid in the receiving chamber or clearwell into which the line controlled by such controllers discharges, and also effect substantially complete shutoff when a predetermined high level is reached.

A still further object is to provide an apparatus and process for effecting gradual rate increases or decreases by substituting an increasing or decreasing portion of controller overall loss for a decreasing or increasing portion of the venturi or controlling head responsive to flow.

Another object is to provide, in a constant differential type of flow controller in which there are three different pressures (high pressure of inlet to Venturi tube and high pressure chamber of the actuator; low pressure of the throat of the Venturi tube; and the intermediate pressure of the low pressure chamber of the actuator) means for automatically modifying the intermediate pressure, thereby automatically establishing new pressure conditions in the controller which fix a new rate of flow.

A further object of the invention is to provide means for automatically substituting a new and sufficient pressure differential in the controller upon changes in flow tending to decrease the differential therein below the value necessary for closing the control valve.

Another object is to provide an apparatus and process for resetting the controller element to a substantially closed position when flow to the controller is cut off by substituting for the normal controlling head responsive to flow another head derived from overall loss sufficiently effective to complete the closing action.

A further object of the invention is to provide a novel rate of flow controller which is sensitive to small variations in the rates of flow over a wide range of flows, in which friction is reduced to a minimum, and in which the control valve will be completely closed upon the happening of either the termination of flow through the conduit or the rise of liquid to a predetermined level in a basin connected to the system.

These, and other, objects of the invention will be apparent from the specification and drawings.

It has long been known to regulate a flow through a conduit, such as a filter effluent pipe, from a pressure differential created by a Venturi tube. Such control is necessary, for example, in the operation of a filter system in order to prevent a dangerous rush of water through the filter bed when the filter is first placed in operation. Early controllers of this type were subject to criticism in that they did not automatically close their flow control valves upon termination of flow through the effluent. In early installations it was therefore necessary to provide manually operated valves for gradually introducing flow through such a conduit. It was later proposed to provide attachments to such controllers such as counterweights, hydraulically operated pilot valves, and the like, to automatically close the flow control valve upon termination of flow through the conduit and to gradually permit the resumption of flow when desired. Such structures were quite complicated and therefore expensive, and also required considerable adjustment from time to time. Also in many such types of apparatus there were required heavy counterweights, stuffing boxes and other inertia or friction producing parts which consumed a considerable amount of the pressure differential derived from the Venturi tube, thereby increasing the size and cost of the apparatus and also adversely affecting the operation of the controller since friction and inertia tend to prevent the beginning of a compensation movement of the controller and also to stop it short of completion.

In my improved controller the regulation of the rate of flow is provided by a means which is entirely enclosed, thereby eliminating closely fitting rubbing surfaces or stuffing boxes, and also avoiding the use of heavy counterweights, thereby permitting the use of a smaller and lighter controller, and at the same time imparting great sensitivity over a wide range of flows. It is therefore an object of my invention to provide in a flow controller of the type actuated solely by a pressure differential of slight magnitude created by any suitable pressure differential creating means, such as a Venturi tube, a simple and inexpensive device which will automatically act to entirely close the control valve under certain conditions, such as the termination of flow through the conduit itself or when the reservoir for receiving the flow becomes filled, or both such conditions.

In order to make the invention and its application readily understood, it will be described in connection with a gravity type filtering system, such as used in municipal filtering plants, swimming pools and the like, although it is not limited thereto. Obviously the application of my invention will be suitable to many different types of fluid flow controllers, but it will be shown and described, for purposes of exemplification, in connection with the "constant differential" controller of the Patent No. 1,934,759, of Adelson, in connection with which it is particularly well adapted to secure the novel modification or resetting thereof.

Also, the device of this application is particularly adapted for use with so-called "direct acting controllers," i. e., such types as employ substantially balanced control valves and utilize self-contained or direct valve actuating means, and will be shown in connection therewith. However, the present invention is not to be limited to the constant differential controller of Adelson or to a direct acting controller, as it might also be used in connection with other types of control devices.

My invention will be more readily understood by reference to the drawings, which form a part hereof and in which like reference characters designate similar elements.

Figure 2 is an enlarged vertical cross-sectional view of the actuator mechanism including the flow controller and the reset device of my invention.

Figure 1:
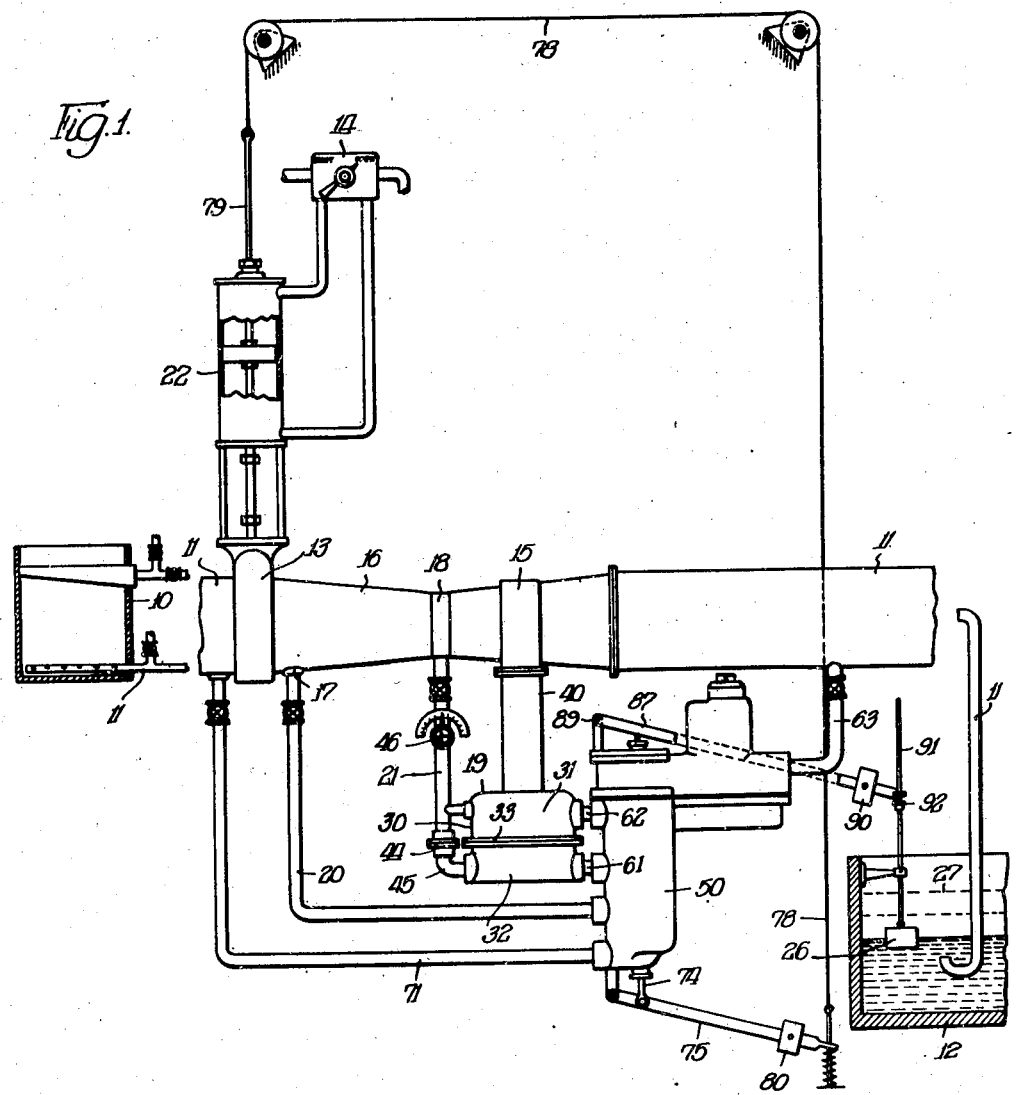
Figure 1 shows a diagrammatic view of a complete flow system, including a direct acting, constant differential type of controller of the type referred to herein.

Figure 1 is a somewhat schematic illustration of my invention in connection with a flow system in which it is necessary to maintain a uniform predetermined flow therethrough, a gravity filter plant being an excellent illustration of such system. A gravity filter 10 is connected by means of effluent conduit 11 with a filtered water reservoir 12. It is well known that flow through the filter 10 must be carefully controlled to avoid damage thereto. It is also known that it is necessary to backwash and clean the filter from time to time and during such backwashing it is necessary to completely shut off the flow through the conduit 11. The conduit 11 is therefore provided with a shutoff valve 13 which may be operated by any suitable means such as a pilot valve 14 controlling flow of pressure liquid to the hydraulic cylinder 22 which positions the shutoff valve 13. The volume of flow through the conduit 11 is controlled by an automatic flow control valve 15. The control valve 15 is operated from a pressure differential created by a suitable resistance in the conduit, such as a Venturi tube 16. It is well known that the pressure differential which exists between the mouth 17 and throat 18 of such a Venturi tube, can be used to position the flow control valve 15 by means of an actuator 19, to be more fully described hereafter, which is connected by a high pressure pipe 20 to the mouth 17 of the Venturi tube and by low pressure conduit 21 to the throat 18 thereof.

Pressure differential responsive devices 19 are well known and ordinarily comprise a casing 30 commonly constructed from two concave castings 31 and 32 rigidly secured to each other, as at 33. A flexible diaphragm 34 is rigidly held in the casing, as by clamping between the two sections at joint 33. This diaphragm divides the casing 30 into two chambers: a high pressure chamber 35 connected to a high pressure portion of the Venturi tube, such as the mouth 17, by the high pressure conduit 20; and a low pressure chamber 36 connected by means of a low pressure conduit 21 to the throat 18, or other low pressure portion, of the Venturi tube 16. One end of a valve positioning rod 37 is attached by any suitable means, such as nuts 38 and 39 to a central portion of the diaphragm 34, and the other end is attached by any suitable linkage, such as a rotatable glanded shaft, not shown, to a preferably balanced type flow control valve 15. Such connections with the flow control valve 15 are well known, as for example, as shown in my prior patent, No. 2,307,273, and need not be described. Such construction permits the valve positioning rod 37 to be enclosed in a casing 40 in free communication with low pressure chamber 36 so that no tightly fitting stuffing boxes are necessary, whereby there is a minimum loss of energy due to friction. I use a constant weight 43 on the diaphragm 34 for a pressure means normally tending to force the diaphragm into the high pressure chamber 35, this weight on the effective area of the diaphragm being such as to oppose a specific portion of the normal Venturi head or pressure. I also prefer the type of diaphragm actuator in which the high pressure chamber 35 and the low pressure chamber 36 are connected through a fixed orifice 44, which can be in the diaphragm itself but which in my preferred structure is more conveniently placed in a bypass 45 connecting the high pressure line 20 or high pressure chamber 35 with the low pressure line 21 or low pressure chamber 36. The fixed orifice 44, between the high pressure chamber 35 and the low pressure chamber 36, permits a constant flow from the high pressure chamber to the low pressure chamber, governed by the size of orifice 44 and the amount of weight placed effectively upon the diaphragm 34, thereby maintaining a constant differential between the two chambers. This constant differential type of controller has several advantages including lighter construction, effective operation on smaller pressure differentials, less loss due to inertia from heavy weights, and the like, which are not possible in old type controllers which had to be built and weighted for the maximum pressure differential that would exist between the unmodified pressures of the inlet and throat of the Venturi tube. I also have a rate setter valve 46 in the low pressure line 21. In the constant differential type of controller there must be a second orifice or other restriction, which is placed between the low pressure chamber and the throat of the Venturi tube in order to cause a back pressure in the low pressure chamber 36. Obviously, without the second restriction, or orifice 46, the pressure in the low pressure chamber and in pipe 21 would be that of the throat of the Venturi tube. By placing the rate setter valve 46 in the low pressure line, a back pressure is caused which increases the pressure in the low pressure chamber, so that there will be a lesser difference in pressures between the two pressure chambers 35 and 36. Thus the constant differential type of controller has and operates with and from, three different pressures: the high pressure of the inlet to the Venturi tube (transmitted to the high pressure chamber); the low pressure of the throat of the Venturi tube (only in the low pressure pipe 21 between the Venturi tube and the rate setter valve 46) and an intermediate pressure (in low pressure chamber 36 and pipe 21 between the orifice 44 and the rate setter valve 46). In practice the second restriction is made adjustable in order to permit change of rates of flow at will. It is well known that the pressure pipes 20 and 21 are relatively large in order to minimize friction losses; the fixed orifice 44 is rather small; and the rate setter valve adjustable from practically zero to the size of the pipe. Thus the rate setter valve, which is seldom changed, must be tight fitting and requires considerable force to change. It is also well known that the value of the Venturi pressure differential (which is the sum of the differentials in the bypass flow due to the fixed orifice 44 and the rate setter valve 46), and thus the rate of flow through the conduit 11 may be readily adjusted by changing the size of the orifice in the rate setter 46, thus changing the value of the drop in pressure therethrough. The flow control system and the constant differential regulator are old, as shown by Adelson, and are not claimed herein.

My invention relates to an improved means whereby the pressure differential responsive device, or actuator 19, will be automatically actuated to modify the rate of flow upon changing outside conditions. For example, my invention may be used to close the flow control valve 15 automatically and promptly upon closing the shutoff valve 13 so that when the shutoff valve 13 is again opened, flow therethrough will be gradually resumed, thereby avoiding damage to the filter 10 which might result from an uncontrolled rush of water therethrough. My invention may also be used to provide an effective and efficient means for actuating the pressure differential responsive device 19 to close the flow control valve 15 whenever the liquid level in the reservoir 12 reaches a predetermined point. Such controls can be secured by a variety of means which modify the intermediate pressure within low pressure chamber 36. For purposes of exemplification I shall describe one of the simplest and most effective of such devices, although other means will be obvious to those skilled in the art upon an understanding of my invention and the principles upon which it is based.

The control device of my invention can be constructed within the actuator casing 30, but it usually is more simple to place it in a separate casing 50 connected as hereinafter described to the actuator 19. The supplemental casing 50 is divided into a high pressure flow passage 51, a low pressure flow passage 52, a reset diaphragm chamber 53, and a waste chamber 54 by the partitions 55 and 56 and the flexible diaphragm 57, respectively. The low pressure flow passage 52 communicates with the reset diaphragm chamber 53 through a constantly open orifice 58 and with the waste outlet chamber 54 through a waste port 59, preferably tapered to form a valve seat, which is shown in the drawing as closed by a tapered, or specially shaped plug valve 60. The high pressure flow passage 51 is connected to the high pressure chamber 35 of the actuator 19 by a pipe 61. Similarly, the low pressure flow passage 52 is connected to the low pressure chamber 36 of the actuator 19 by means of a pipe 62. An outlet pipe 63 leads from the waste compartment 54 to any suitable point of discharge, such as the effluent line 11, at a point below the flow control valve 15, as shown, or directly to the reservoir 12. The connection between the waste pipe 63 and the waste chamber 54 is provided with a substantially balanced type of valve 64 positioned by movement of the reset diaphragm 57. Any balanced type of valve can be used, but I have shown a valve unit which comprises valve seats 65 and 66 spaced a short distance apart and axially aligned one with another, and a valve comprising a cylindrical piston or stem 64a with a plurality of arcuate channels 100 formed therein. In such a valve, the tendency of flow through one valve seat, such as 65, to open or close the valve is opposed by the flow through the other valve seat 66, which forces will be of substantially equal magnitude and in opposite directions, thereby providing a balanced valve. One end of the valve 64, such as 101, bears against, or is attached to, the flexible diaphragm 57, which operates to close valve 64, while a compression spring 67 tends to open it. It is preferred that the valve assembly be provided with stops such as 102 and 103 which prevent excessive movement in either direction. It is preferred that the stop 103 adjacent the spring end of the valve be so placed that the forcing of the valve 64 against that stop will hold the valve in a fully closed position, while the stop 102 limits downward movement to fully opened position. The valve 64 is normally closed when the plug valve 60 is closed, due to higher pressure in chamber 53, than escapement pressure in line 63 and chamber 54. Thus the diaphragm acts to close valve 64 against the force of spring 67, the force of the latter against the diaphragm 57 being adjustable, if desired, by an adjusting screw, not shown, in cap 68.

The high pressure passageway 51 has two inlets: an upper port 70 for the pressure line 20 leading from the inlet end 17 of the Venturi tube 16; and a lower port 72 for a conduit 71 leading from the effluent line 11 above the shutoff valve 13. The two ports 70 and 72 are preferably machined to provide valve seats for the disc valve 73 and are placed in adjacent and opposing relationship so that a small movement of the disc valve 73 will instantaneously open one port and close the other. The valve 73 is mounted on a valve rod 74, extending through the wall of the secondary casing 50, and the partition 55, as shown, into the low pressure passageway 52 to a point sufficiently close to the plug valve 60 operable in the waste port 59 between the low pressure flow passage 52 and the waste compartment 54 to lift the plug valve 60 off its valve seat 59 when the disc valve 73 is raised to close the upper port 70 and open the lower port 72 but to permit the plug valve 60 to rest firmly on the valve seat 59 when the disc valve 73 is lowered to close the lower port 72 and to open the upper port 70. It is preferred that the valve rod 74 not be joined to the plug valve 60 as it is desired that the plug valve 60 may be opened, as by movement of float 26, without changing the setting of the disc valve 73. A lever 75, bearing on a suitable fulcrum, such as 76, is pivotally connected to the valve rod 74, as at 77. The free end of the lever 75 is connected by means of cable 78 to the tail rod 79 of the piston in hydraulic cylinder 22 in such a manner that when the hydraulic power apparatus 22 closes the shutoff valve 13 the lever 75 is moved to open the lower port 72 and close the upper port 70. It is preferred that the lever 75 be provided with a weight 80 at the free end thereof, or other suitable means, to positively move the lever in the reverse direction when the valve 13 is moved to open position and thus to close the lower port 72 and open the upper port 70. It is preferred that a tight fitting gland 81 close the aperture through which the disc valve rod 74 enters the secondary casing 50 in order to provide a water-tight joint at this point. Sufficient force is available for moving the lever 75 to permit such a construction.

The plug valve 60 is moved by means of a valve rod 85 to which it is firmly attached. The rod 85 extends out through the wall of the secondary casing 50 through a packing gland 86 and is pivotally attached to a lever 87 as at 88. The lever 87 is pivoted at any suitable fulcrum, such as at 89, and is preferably provided with a weight 90 at the free end in order to normally close the plug valve 60. A float rod 91 is affixed at one end to the float 26 in the reservoir 12 and the other end engages the free end of the level 87, by any suitable means, such as a collar 92 so that the rising of float 26 above the predetermined level 27 (Figure 1) will gradually lift the plug valve 60 off its seat 59, thereby permitting flow of liquid from the low pressure passage 52 into the waste compartment 54 and thence out through outlet valve 64 and outlet pipe 63. The outlet valve 64 will be opened at this point, as hereinafter described. On the reverse movement of the float 26, in dropping below the predetermined liquid level 27 in the reservoir, the plug valve 60 is again seated on the valve seat 59 and the communication between the low pressure flow passage 52 and the waste compartment 54 is closed. As indicated above, the plug valve 60 is also lifted from its seat by the movement of the disc valve rod 74 which opens the lower inlet port 72 and closes the upper inlet port 70.

The normal operation of the flow controller herein described (that is, when the shutoff valve 13 is opened so that flow will pass through the Venturi tube 16, flow control valve 15, and thence to reservoir 12, which is not filled to the predetermined level 27) is the same as that of the Adelson controller. In such normal operation disc valve lever 75 will be lowered, thereby closing the lower port 72 and opening the upper port 70. Also in normal operation the float 26 would be below the predetermined upper level 27 of water in the reservoir 12 so that the plug valve 60 is also closed. Water, under the pressure existing at the mouth 17 of the Venturi tube, passes through the first, or high, pressure conduit 20, the upper port 70, into the high pressure passage 51, and thence through pipe 61, into high pressure chamber 35 of the actuator 19, whereby the pressure in chamber 35 will tend to raise the weighted diaphragm 34 and close flow control valve 15. Such flow of water can escape from the high pressure chamber 35, through the bypass 45, and the orifice 44, into low pressure pipe 21, through rate setter valve 46, and into the throat 18 of the Venturi tube. Three pressure values, as indicated above, are used in the constant differential system—namely, upstream of the Venturi tube; an intermediate pressure lower than upstream; and throat pressure of the venturi. The low pressure chamber 36 communicates with the zone of intermediate pressure between the two orifices 44 and 46 and thus while technically known as the "low pressure" chamber it is actually subject to the intermediate pressure of the constant differential system. Of these pressures only upstream and intermediate are balanced by the amount of weight placed on the diaphragm whose high and low pressure chambers connect to upstream and intermediate pressure zones—that is, across the fixed or primary orifice 44. Such a structure provides for a constant differential in the pressures between the high pressure chamber 35 and the low pressure chamber 36 regardless of the actual difference in pressure between the mouth 17 and throat 18 of the Venturi tube.

The constant differential controller, and its operation above described, is not claimed herein, as my invention relates to means for automatically modifying the intermediate pressure of the Adelson system so that a new summation of losses through valve rate setter 46 and orifice 44 will be balanced by a new Venturi head upon the occurrence of certain outside conditions. Such outside conditions may be the raising or lowering of the liquid level in the reservoir 12. Upon the termination of the outside conditions the original values are reestablished and the original Venturi head used for control.

It is obvious that in normal operation there will be no possible flow from the low pressure chamber 36, through the waste chamber 54, and the waste pipe 63, as the plug valve 60 will be tightly closed. The waste valve 64 will also be closed as water in the reset diaphragm chamber 53 will be under the same intermediate pressure as exists in the low pressure chamber 36, as chamber 53 is open to the low pressure chamber 36, through the orifice 58, and low pressure passage 52, and pipe 62. There will be no counterbalancing pressure in the waste chamber 54, so that the pressure under the diaphragm 57 (being greater than the pressure in the waste chamber 54) will overcome the force of the spring 66 and close the waste valve 64.

Closing of shutoff valve 13 moves the tail rod 79 to which cable 78 is attached, and raises lever 75, thereby raising the disc valve rod 74 to move the disc valve away from the lower port 72 and close the upper port 70. The movement of the disc valve rod 74 also lifts the plug valve 60 from its valve seat or orifice 59, thus providing passage for water from above the shutoff valve 13 through the second high pressure line 71, lower port 72, high pressure passage 51, pipe 61, high pressure chamber 35, orifice 44, low pressure chamber 36, pipe 62, low pressure passage 52, orifice 59, chamber 54, through valve 64, and pipe 63, to line 11. With valve 13 closed, the tube 18 and line 11 following valve 13 are under a negative head or at least a much lower head than is stopped off by valve 13. This head provides the gradient for the flow traced above.

It will be understood that by the raising of the plug valve 60 off its seat a passage for the escape of water from low pressure chamber 36, much larger than that of the orifice in rate setter valve 46, is provided. The equalization of pressures across the diaphragm 57 is sufficient to allow the spring 67 to open waste valve 64 and thus open the passage to waste line 63. This new course of flow from low pressure chamber 36, being larger than the orifice of the rate setter valve 46, causes less back pressure in the low pressure chamber 36, so that a new differential is established between high and low pressure chambers 35 and 36. This new differential is due to the fact that the size of the above flow is large in relation to the size of orifice 44 and that in rate setter valve 46. Thus there is little or no back pressure on low pressure chamber 36, so that there will be a considerable differential, or drop in pressures, between high pressure chamber 35 and low pressure chamber 36—thus providing a sufficient force to close the control valve 15 and keep it closed. When the shutoff valve 13 is again opened, the tail rod 79 will rise and permit the lever 75 to drop, thereby moving disc valve 73 from across the upper port 70 to close the lower port 72 and permitting plug valve 60 to drop and again become seated in its associated orifice 59. At this point there will be no appreciable flow through the Venturi tube as the valve 15 is closed, although there may be a little leakage around the control valve 15, as such valves ordinarily are constructed to permit a small flow therethrough. Obviously, from the means shown, the change from one flow from one high pressure line to another will be instantaneous and at the moment of opening the upper port 70, and closing the lower port 72, the actuator will be filled with liquid so that a sharp movement of the diaphragm, with resultant rapid opening of the flow control valve 15 is impossible. Also, upon the movement of lever 75 to close lower port 72, and open port 70, the plug valve 60 will be permitted to become reseated on its valve seat 59, thereby terminating the secondary flow from low pressure chamber 36 through waste compartment 54, thus directing all of the bypass flow through the fixed orifice 44, low pressure line 21, and its restricted orifice 46. The pressures in both high pressure conduit 20 and intermediate pressure conduit 21 will therefore be substantially the same, as will the pressures in the two pressure chambers 35 and 36. The effect of weight 43 on diaphragm 34, now unopposed by pressure, will be to permit it to slowly drop thereby opening flow control valve 15. The movement of the diaphragm, however, will be slow as both low pressure chamber 36, and high pressure chamber 35, and connecting passageways, will be full of water. The movement of the diaphragm, therefore, can be accomplished only as water is displaced from high pressure chamber 35, through restricted orifice 44, into low pressure chamber 36, thus providing a very gradual opening of flow control valve 15, due to this dash pot action. It is of course obvious that regardless of how rapidly shutoff valve 13 is opened, normal operating conditions are set up gradually because of the gradual opening of control valve 15. The amount of opening of valve 15 is automatically limited when flow therethrough sets up a Venturi head that again equals the sum of the losses through fixed orifice 44 and rate setter valve 46.

The operation of my reset device from the liquid level in the clearwell 12, reaching a predetermined point, such as 27, is somewhat similar in effect. However, the opening or closing of the valve 15 in this event is controlled entirely by the position of the float 26, while in the above described actuation by opening or closing of shutoff valve 13, the action is as instantaneous as the dash pot effect of the actuator 19 will permit. As the float 26 rises, the collar 92 engages the lever 87, thereby gradually lifting needle valve 60 from its associated orifice. It will be obvious that with a tapered plug valve, or one of other variable diameter, the amount of flow through the orifice 59 will be proportional to the position of the valve plug 60. As the valve 60 is lifted, the pressure in the waste chamber 54, and reset diaphragm chamber 53, will be equalized, and the valve 64 will be opened by spring 67, thus permitting a flow from the waste chamber 54. This modification of the intermediate pressure through loss of water through waste line 63, rather than the smaller orifice of rate setter valve 46, creates a new differential between the pressures in the pressure chambers 35 and 36. However, the flow from the low pressure chamber 36 will be controlled by the degree to which the orifice 59 is opened, so that as the valve 60 is lifted the pressure differential between high pressure chamber 35 and low pressure chamber 36 will gradually increase, thus affording a gradual closing of the flow control valve 15. The closing of the flow control valve 15 will be directly proportional to the rise of the float 23, as the free space opened by the plug valve 60 will vary according to the amount of movement of that valve. This not only permits a gradual closing of the flow control valve 15 but also a gradual opening thereof at such time as the float 23 is lowered, thereby closing the needle valve 60, as herein described. As water is withdrawn from the reservoir 12, the liquid level will fall below the predetermined point, the float 26 will drop, thereby lowering the lever 87 and again seating the plug valve 60 on valve seat 59. The closing of the needle valve 60 will terminate flow from the pressure chamber 36 to waste chamber 54 and thence to waste, thus gradually reestablishing the normal operation of the actuator 17.

It is apparent that my reset, or modification, of control is through a modification of the intermediate pressure of the constant differential system. It can also operate on the old system of a high and low pressure only (no bypass flow around the diaphragm of the controller) by maintaining the high pressure constantly and withdrawing water from the low pressure side to establish a new differential.

It is believed obvious that the device of my invention, which in its preferred form is directed to the closing of the flow control valve 15, by either the closing of the shutoff valve 13 or the rise of liquid level in the reservoir 12 to a predetermined point, can be adapted to do either alone. Thus my invention in its preferred form combines the two controls in one compact and simple mechanism but if, for any reason, it is desired to use one control to the exclusion of the other it can readily be done by eliminating one or the other feature, without affecting the operation of the control which remains.

It might be noted that the plug valve 60 can be conical, as shown, which provides for a uniform progression from closed to fully open position. If a variable progression is desired such as rapid initial opening of orifice 59, followed by more gradual opening to fully open position, or a very gradual initial opening followed by a more rapid one, it can be easily secured by changing the form of the plug, as for instance, to parabolic form.

It will also be obvious that my reset device can be adapted to a battery of flow systems such as that found in many municipal filter plants where a battery of filters is necessary, so that each actuator reset device can be set to operate to modify or reset its controller at different levels in the liquid in the clearwell. Thus flow through some of the filters can be terminated when the level reaches some intermediate point and others successively as the liquid level rises.

It is obvious that my reset device provides for gradual increases and decreases in flow through the controlled opening of flow control valve 15, thereby avoiding surging and the dangers inherent thereto. It is also obvious that the actuator and the reset device are at all times ready to control or modify the control without delay due to inertia or other static conditions.

Various modifications of the device herein described will be obvious to those skilled in the art so that it is intended that the above description shall be deemed as illustrative of my invention and not as a limitation thereof.

I claim:

1. An actuator adapted for use in a filter system including a main conduit, a shutoff valve in said conduit, and a pressure differential creating member in said conduit, said actuator comprising a casing, a diaphragm dividing said casing into two chambers, means adapted to operatively join said diaphragm to a device to be actuated, a first pressure port adapted to connect one of said chambers with a point of high pressure in the pressure differential creating member, a second pressure port adapted to connect the other chamber with a point of low pressure in said pressure differential creating member, an inlet into said first chamber adapted to connect the same to a point in said main conduit on the upstream side of said shutoff valve, an outlet from said second chamber, a normally closed valve on said outlet, means effective on closing of said shutoff valve to position said valve means to open said inlet and close said first pressure port, and means effective on opening of said inlet to open said valve on said outlet.

2. An actuator adapted for use in a flow system including a main conduit, a shutoff valve in said conduit, a pressure differential creating member in said conduit and a basin receiving liquid from said conduit; said actuator comprising a casing, a diaphragm dividing said casing into two chambers, means adapted to operatively join said diaphragm to a device to be actuated, a first pressure port adapted to connect one of said chambers with a point of high pressure in the pressure differential creating member, a second port adapted to connect the other chamber with a point of low pressure in said pressure differential creating member, an inlet into said first chamber adapted to connect the same to a point in the main conduit on the upstream side of said shutoff valve, inlet valve means associated with said inlet and said first pressure port normally closing the former and opening the latter, an outlet from said second chamber, a normally closed outlet valve on said outlet, means effective on closing of said shutoff valve to position said inlet valve means to open said inlet and close said first pressure port and to open said outlet valve, a member sensitive to change of the liquid level in said basin, and means operatively connecting said last mentioned member to said outlet valve to open said outlet valve upon the liquid level in said basin reaching a predetermined point.

3. In a flow system including the combination of a main conduit, a shutoff valve in said conduit, a pressure differential creating device in said conduit, a flow control valve in said conduit, and a basin receiving liquid from said conduit, an improved actuator for said flow control valve comprising a casing, a diaphragm dividing said casing into two chambers, said diaphragm being joined to said flow control valve, a first pressure conduit connecting one of said chambers with the high pressure side of said pressure differential creating means, a second pressure conduit connecting the other of said chambers with the low pressure side of the pressure differential creating means, a weight normally forcing said diaphragm from said second chamber into said first chamber, a communication provided with a fixed orifice between said chambers, a second and smaller orifice in said second pressure conduit, an inlet into said first chamber communicating with said main conduit above said shutoff valve, an outlet from said second chamber, valve means normally closing said inlet and opening said first pressure conduit and operable on the closing of said shutoff valve to open said inlet and to close the first pressure conduit, valve means normally closing said outlet and operable on the closing of said shutoff valve to open said outlet, and means operable by the level of liquid in said receiving basin to independently position the valve means in said outlet.

4. In a constant differential type actuator for a flow control valve, said actuator including a high pressure chamber, a low pressure chamber, a flexible diaphragm separating said chambers, an inlet into said high pressure chamber, an outlet from said low pressure chamber, a communication between said chambers having a cross-sectional area less than that of said inlet into said high pressure chamber, and an orifice in said outlet from said low pressure chamber having a cross-sectional area less than that of said communication, means for automatically setting the actuator to control in response to a change in an outside condition which comprises means for modifying the difference in pressure between said chambers independently of any change in the normal pressure difference between them, said means including a second outlet from said low pressure chamber, a valve in said second outlet, and means to position said valve in response to said outside condition.

5. In a flow control system comprising a Venturi tube, a bypass between the inlet and throat of said Venturi tube, a pressure differential sensitive member so positioned in said bypass as to receive high pressure from said Venturi inlet on one side and low pressure from said Venturi throat on the other and adapted to be joined to a device to be actuated, and a restricted passageway between the two sides of said pressure differential sensitive member, the combination with said pressure differential sensitive member of a secondary inlet into said bypass on the high pressure side of said pressure differential sensitive member from a source of hydraulic pressure effective to create pressure irrespective of pressure conditions in said Venturi tube, an outlet from the low pressure side of said pressure differential sensitive member, valve means in said secondary inlet and said outlet normally closing the same and means operable to open said valve means.

6. In combination with a control valve actuator adapted to control flow in a filter system, said system including a filter, a filtered liquid receiving basin, a main conduit for filtered liquid from said filter to said basin, a shutoff valve in said conduit, and a flow control valve in said conduit, said actuator including a casing, a diaphragm dividing said casing into two chambers, a first pressure conduit connecting one of said chambers with a high pressure area in said system, a second pressure conduit connecting the other of said chambers with a low pressure area in said system, a pressure means normally tending to force said diaphragm into said first chamber, a bypass from said first chamber to said second chamber, an orifice in said bypass, and a second orifice in said second pressure conduit: an improved means for modification of normal operation of said actuator to close said flow control valve upon the termination of flow through said system and independently upon the filling of said basin, said means comprising a secondary inlet connecting said first chamber with said conduit on the upstream side of said shutoff valve, an outlet from said second chamber, valve means normally closing said inlet, separate valve means normally closing said outlet, means operable by the closing of said shutoff valve to open said valve means in said secondary inlet and in said outlet and to close said first pressure conduit, a float in said basin, and means operable by the raising of said float above a predetermined level to open said valve means in said outlet.

7. An actuator adapted for use in a flow system including a pressure differential creating member comprising a casing, a diaphragm dividing said casing into two chambers and adapted to be operatively joined to a device to be actuated, a first pressure inlet adapted to connect one of said chambers with a point of high pressure in the pressure differential creating member, a second pressure inlet adapted to connect the other chamber with a point of low pressure in said differential creating member, a restricted communication between said chambers, and means for modifying operation of said diaphragm comprising a third pressure inlet adapted to connect said first chamber to an independent point of pressure, a valve means normally closing said third pressure inlet and opening said first pressure inlet and operable on termination of flow through said system to open said third pressure inlet and to close the first pressure inlet.

8. An actuator adapted for use in a flow system which includes a pressure differential creating member, comprising a casing, a diaphragm dividing said casing into two chambers and adapted to be operatively connected to a device to be actuated, a first pressure inlet adapted to connect one of said chambers with a point of high pressure in the pressure differential creating member, a second pressure inlet adapted to connect the other chamber with a point of low pressure in said differential creating member, a restricted communication between said chambers, a rate setter orifice in said second pressure inlet, and means for modifying operation of said diaphragm independently of the pressure difference between said points of high and low pressure, comprising an outlet from the other of said chambers, a valve in said outlet normally closing the same and means to position said valve to open said outlet.

9. An actuator for a flow system that includes a pressure differential creating member, said actuator comprising a casing, a diaphragm dividing said casing into two chambers and adapted to be operatively connected to a device to be actuated, a first pressure inlet adapted to connect one of said chambers with a point of high pressure in the pressure differential creating member, a second pressure inlet adapted to connect the other chamber with a point of low pressure in said differential creating member, a restricted communication between said chambers, a restriction in said second pressure inlet, a means for positioning the device to be operated independently of flow through said pressure differential creating member, said means comprising a second casing, a diaphragm dividing said casing into two compartments, a constantly open conduit connecting said low pressure chamber with a first of said compartments, an inlet into the second of said compartments from said low pressure chamber, a variably shaped plug valve in said inlet, an outlet from said second compartment, a balanced valve means in said outlet, mechanical pressure means tending to normally open said outlet valve, said outlet valve being joined to said last mentioned diaphragm in such manner that pressure on said diaphragm from said first compartment tends to close said valve, and means to independently position said plug valve.

10. In a constant differential type actuator for a flow control valve, said actuator including a high pressure chamber, a low pressure chamber, a flexible diaphragm separating said chambers. an inlet into said high pressure chamber, an outlet from said low pressure chamber, a communication between said chambers having a cross-sectional area less than that of said inlet into said high pressure chamber, and an orifice in said outlet from said low pressure chamber having a cross-sectional area less than that of said communication, means for automatically setting the actuator to control in response to a change in an outside condition which comprises means for modifying the difference in pressure between said chambers independently of any change in the conditions creating the normal pressure difference between them, said means including a second inlet into said high pressure chamber, a valve means normally closing said second inlet and opening said first inlet into said high pressure chamber, and means to position said valve means in response to said outside condition.

11. In a constant differential type actuator for a flow control valve, said actuator including a high pressure chamber, a low pressure chamber, a flexible diaphragm separating said chambers, an inlet into said high pressure chamber, an outlet from said low pressure chamber, a communication between said chambers having a cross-sectional area less than that of said inlet into said high pressure chamber, and an orifice in said outlet from said low pressure chamber having a cross-sectional area less than that of said communication, means for automatically setting the actuator to control in response to a change in an outside condition which comprises means for modifying the difference in pressure between said chambers independently of any change in the conditions creating the normal pressure difference between them, said means including a second inlet into said high pressure chamber, valve means normally opening said first inlet into said high pressure chamber and closing said second inlet, a second outlet from said low pressure chamber, a valve in said second outlet, and means to position said valves in response to said outside condition.

WALTER J. HUGHES.

REFERENCES CITED

The following references are of record in the file of this patent:

UNITED STATES PATENTS

| Number | Name | Date |
| --- | --- | --- |
| 840,877 | Steedman | Jan. 8, 1907 |
| 1,156,855 | Akans | Oct. 12, 1915 |
| 1,934,713 | Hughes | Nov. 14, 1933 |
| 1,936,373 | Adelson | Nov. 21, 1933 |
| 2,223,623 | Koupal et al. | Dec. 3, 1940 |
| 2,292,703 | Lawler | Aug. 11, 1942 |
| 2,347,837 | Morrison | May 2, 1944 |

FOREIGN PATENTS

| Number | Country | Date |
| --- | --- | --- |
| 539,068 | Great Britain | Aug. 27, 1941 |